(12) United States Patent
Liston

(10) Patent No.: US 7,435,056 B2
(45) Date of Patent: Oct. 14, 2008

(54) LEADING EDGE EROSION PROTECTION FOR COMPOSITE STATOR VANES

(75) Inventor: Laurence D. N. Liston, Gilbert, AZ (US)

(73) Assignee: Honeywell International Inc., Morristown, NJ (US)

(*) Notice: Subject to any disclaimer, the term of this patent is extended or adjusted under 35 U.S.C. 154(b) by 243 days.

(21) Appl. No.: 11/413,755

(22) Filed: Apr. 28, 2006

(65) Prior Publication Data

US 2007/0201984 A1 Aug. 30, 2007

Related U.S. Application Data

(60) Provisional application No. 60/777,321, filed on Feb. 28, 2006.

(51) Int. Cl.
*F01D 9/00* (2006.01)

(52) U.S. Cl. .................. 416/230; 416/241 R; 415/191; 415/200

(58) Field of Classification Search ............. 415/9, 415/191, 200, 208.2; 416/224, 230, 241 A, 416/241 R; 428/297.4, 418
See application file for complete search history.

(56) References Cited

U.S. PATENT DOCUMENTS

| | | | |
|---|---|---|---|
| 3,844,728 A | 10/1974 | Copley et al. | |
| 3,892,612 A | 7/1975 | Carlson et al. | |
| 4,006,999 A | 2/1977 | Brantley et al. | |
| 4,384,452 A | 5/1983 | Rice | |
| 5,448,828 A | 9/1995 | Willems et al. | |
| 5,449,273 A | 9/1995 | Hertel et al. | |
| 5,547,342 A * | 8/1996 | Furseth et al. | 415/200 |
| 5,569,019 A | 10/1996 | Katariya et al. | |
| 5,603,603 A | 2/1997 | Benoit et al. | |
| 5,702,829 A | 12/1997 | Paidassi et al. | |
| 5,951,254 A | 9/1999 | Sikorski et al. | |
| 6,132,857 A | 10/2000 | Champenois et al. | |
| 6,451,454 B1 | 9/2002 | Hasz et al. | |
| 6,485,678 B1 * | 11/2002 | Liang et al. | 420/37 |
| 2003/0082048 A1 | 5/2003 | Jackson et al. | |
| 2004/0170849 A1 | 9/2004 | Ackerman et al. | |
| 2005/0112411 A1 | 5/2005 | Gray et al. | |
| 2005/0207896 A1 | 9/2005 | Gigliotti, Jr. et al. | |

FOREIGN PATENT DOCUMENTS

JP 1056849 A 3/1989

* cited by examiner

*Primary Examiner*—Edward Look
*Assistant Examiner*—Nathaniel Wiehe
(74) *Attorney, Agent, or Firm*—Ingrassia, Fisher & Lorenz, P.C.

(57) ABSTRACT

The present invention provides a turbofan engine including leading edge erosion protection for composite stator vanes contained therein. The composite stator vanes are defined by a leading edge, a trailing edge, a concave surface and a convex surface. The vanes are generally formed of a graphite fiber and an aramid fiber braided preform that is laminated with an epoxy matrix resin or other high temperature matrix resin. A wire mesh screen is embedded during a molding process into an outermost surface of the leading edge of the epoxy matrix resin. A tapering erosion protection layer comprised of an erosion protective material is applied to the wire mesh screen at the leading edge of the composite stator vane an aids in protecting the leading edge of the stator vane from debris and contaminants, including operational fluids, dust, and sand that may be carried in an air stream passing therethrough the turbofan engine, as well as an erosive operational environment.

19 Claims, 3 Drawing Sheets

LEADING EDGE EROSION PROTECTION FOR COMPOSITE STATOR VANES

CROSS-REFERENCE TO RELATED APPLICATION

This application claims the benefit of U.S. Provisional Application No. 60/777,321, filed Feb. 28, 2006.

FIELD OF THE INVENTION

The present invention relates to turbofan turbine engines and multilayer materials for erosion protection. More particularly, the present invention relates to the fabrication of a multilayer erosion protection material for a composite stator vane.

BACKGROUND OF THE INVENTION

A gas turbine engine may be used to power various types of vehicles and systems. A particular type of gas turbine engine that may be used to power aircraft is a turbofan gas turbine engine. A turbofan gas turbine engine may include, for example, five major sections, a fan section, a compressor section, a combustor section, a turbine section, and an exhaust section. The fan section is positioned at the front, or "inlet" section of the engine, and includes a fan that induces air from the surrounding environment into the engine, and accelerates a fraction of this air toward the compressor section. The remaining fraction of air induced into the fan section is accelerated into and through a bypass plenum, and out the exhaust section producing much of the thrust.

The compressor section raises the pressure of the air it receives from the fan section to a relatively high level. In a multi-spool engine, the compressor section may include two or more compressors. For example, in a triple spool engine, the compressor section may include a high pressure compressor, and an intermediate compressor. The compressed air from the compressor section then enters the combustor section, where a ring of fuel nozzles injects a steady stream of fuel. The injected fuel is ignited by a burner, which significantly increases the energy of the compressed air.

The high-energy compressed air from the combustor section then flows into and through the turbine section, causing two or more rotationally mounted turbines to rotate and generate energy. As the turbines rotate, each drives equipment in the engine via concentrically disposed shafts or spools. For example, one or more turbines may drive one or more compressors in the compressor section, and one turbine typically drives the fan. The air exiting the turbine section is exhausted from the engine via the exhaust section, and the energy remaining in this exhaust air aids the thrust generated by the air flowing through the bypass plenum.

The fan in a turbofan engine is generally composed of many rotor blades and stator vanes. During engine operation, the blades rotate, while the stator vanes remain stationary. In a typical configuration, the fan section may include a plurality of sets or rows of rotor blades and stator vanes along the axial length of an air intake path of generally annular shape.

It is well known that in turbofan engines, abrasive particles, such as sand or dust, act as an abrasive upon impact and may cause erosion of the materials forming component engine parts. In the case of composite static stator vanes found directly behind the fan blades, wear by erosion to the leading edges of the static stator vanes leads to deterioration of the performance characteristics of the engine.

Current composite stator vanes are constructed to include a stainless steel mesh screen disposed over a composite epoxy resin system. Over time, a portion of stainless steel mesh proximate the leading edge of the stator vane may erode and/or become delaminated from the composite epoxy resin. Additionally, the composite epoxy resin may also erode and may leave the mesh unsupported. Eventually, the stainless steel mesh may split and open up causing a flow disturbance in the fan bypass path which may result in degraded performance and loss of engine thrust.

Accordingly, it is desirable to provide for an improved stator vane that includes leading edge erosion protection. In addition, it is desirable to extend the life of a composite stator vane in light of abrasive damage to the leading edge of the stator vane. Finally, it is desired to provide a method for preventing erosion to the leading edge of the stator vane that is less costly as compared to the alternative of replacing the damaged stator vane with a new one. The present invention addresses one or more of these needs.

SUMMARY OF THE INVENTION

The present invention provides leading edge erosion protection for composite stator vanes. In one embodiment, and by way of example only, there is provided a turbofan engine comprising a turbofan rotor positioned to direct intake air therethrough and a gas turbine engine disposed downstream of the turbofan rotor and comprising a compressor, a combustor and a turbine. A plurality of composite stator vanes is disposed between the turbofan rotor and the gas turbine core engine. The plurality of composite stator vanes are configured to receive aid directed through the turbofan rotor and direct the received intake air into the gas turbine engine core. Each of the composite stator vanes is defined by a leading edge, a trailing edge, a concave surface and a convex surface. The composite stator vanes are comprised of an epoxy resin matrix or other higher temperature polymer resin matrix with a composite preform, a wire mesh screen molded into the leading edge of the composite stator vane, and a plasma coating disposed on the wire mesh screen.

In a further embodiment, still by way of example only, there is provided a composite stator vane comprised of a graphite fiber and synthetic fiber made from aramids, nylons, or poly-parapheylene, such as Kevlar®, wound and twisted or braided preform laminated with an epoxy matrix resin or other high temperature polymer matrix resin. The composite stator vane is defined by a leading edge, a trailing edge, a concave surface and a convex surface. A wire mesh screen is embedded into an outermost surface of the leading edge of the epoxy matrix resin. An erosion protection layer, comprised of an erosion protective material, is applied to the wire mesh screen at the leading edge of the composite stator vane.

In still a further embodiment, and still by way of example only, there is provided a composite stator vane defined by a leading edge, a trailing edge, a concave surface and a convex surface. The composite stator vane is comprised of a graphite and synthetic fiber braided preform laminated with an epoxy or other higher temperature matrix resin. A wire mesh screen is embedded into an outermost surface of the epoxy matrix resin at the leading edge of the composite stator vane, wherein the wire mesh screen has a trailing edge located in a range of 0.1 to 0.5 inches from the leading edge of the composite stator vane. An erosion protection layer comprised of an erosion protective material is applied to the wire mesh screen. The erosion protection layer tapers from a thickness in a range of 0.001 to 0.005 inches at the leading edge of the composite stator vane to zero at the trailing edge of the wire mesh screen.

Other independent features and advantages of the adaptive machining and weld repair process will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
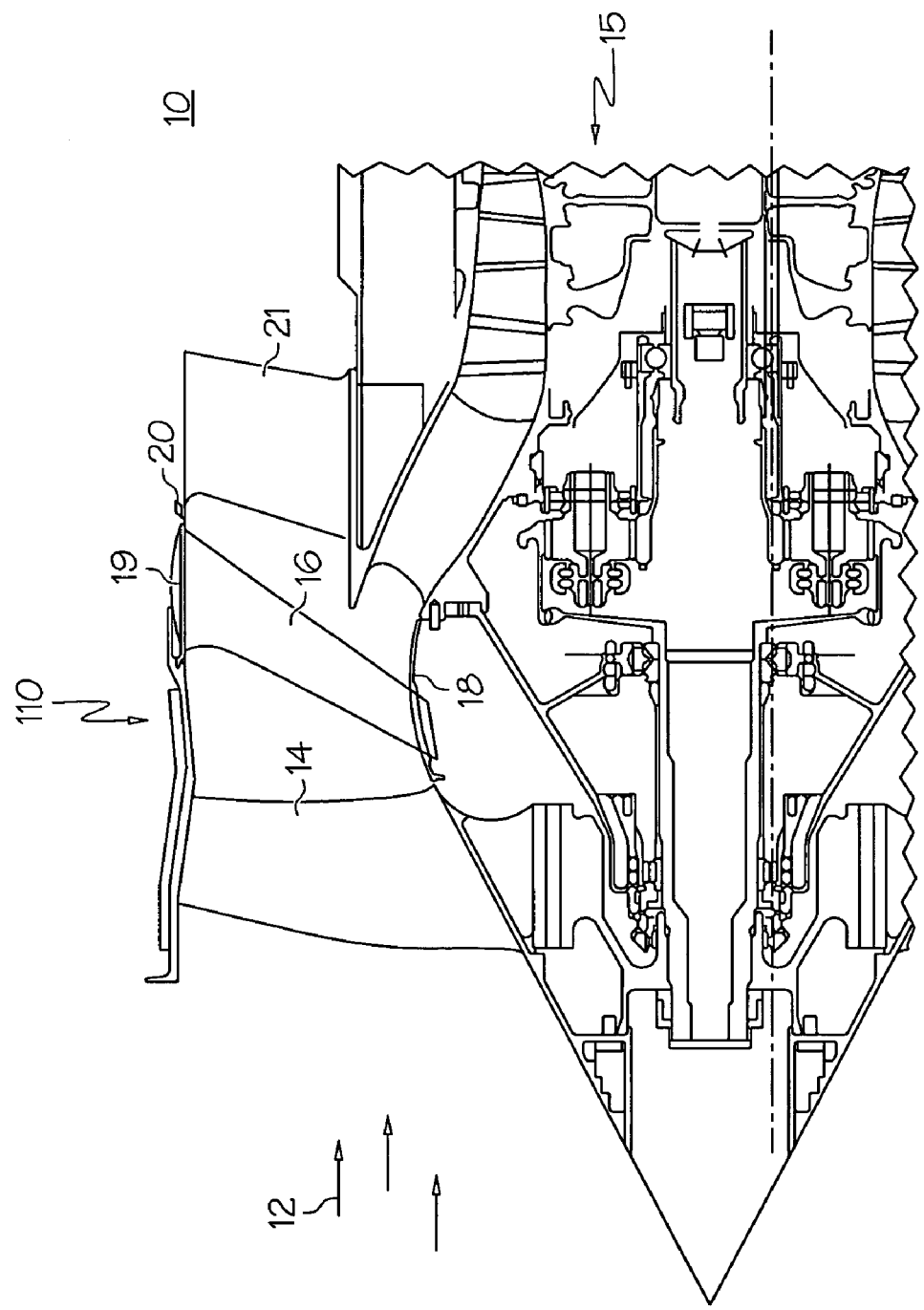
FIG. 1 is a partial cross-sectional view of turbofan engine, including a plurality of static stator vanes, according to an embodiment of the present invention.

Referring to the drawings, FIG. 1 is a first stage fan section 11 of a typical gas turbofan engine, generally referenced 10. During operation, intake air, represented by arrows 12, flows from into the engine 10, through a turbofan fan rotor 14, also referred to as an engine bypass fan, and toward a core engine, generally referenced 15. The intake air ultimately exits engine 10 through a turbine nozzle (not shown) located at the rear of the engine 10. Positioned behind the turbofan rotor 14 is a circumferential row of a plurality of composite stator vanes 16, of which only one is illustrated in FIG. 1. The plurality of composite stator vanes 16 are assembled into a stator hub 18 and a shroud ring 19 and supported with grommets, forming a stator vane assembly 20. The stator vane assembly 20 is installed in the engine 10 behind the turbofan rotor 14 and forward a front frame 21. The plurality of composite stator vanes 16 are formed from suitable vane material capable of withstanding the impact of incoming air and erosion. As shown, the composite stator vane 16 project radially outwardly from the stator hub 18 to the shroud ring 19. The composite stator vane 16 are typically welded to or cast in unitary form with the stator hub 18 and shroud rings 19, which are preferably segmented. In this particular engine 10, multiple such composite stator vanes 16 are positioned in adjacent circumferential position along the stator hub 18 and the shroud ring 19.

Figure 2:
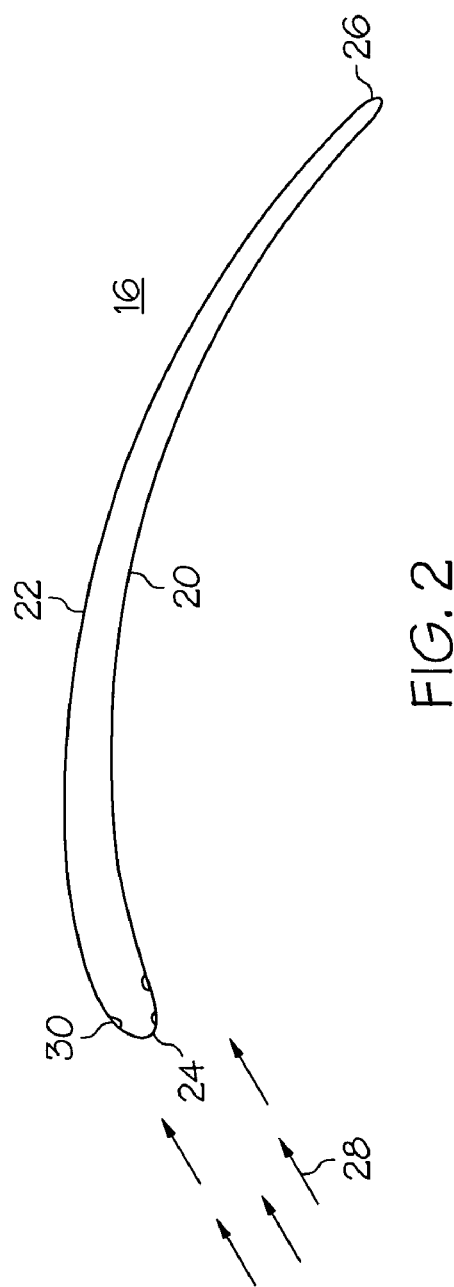
FIG. 2 is a side elevation view of a static stator vane showing directional airflow with respect to the eroded leading edge that may be repaired according to an embodiment of the present invention.

Referring now to FIG. 2, illustrated is a single composite stator vane 16 of the turbofan engine 10 (FIG. 1). The composite stator vane 16 is typically a few inches in length and may have a different geometry and/or design than that illustrated, depending on the particular engine model in which it will be used and on its application. In general, the composite stator vane 16 is characterized by a complex geometry that changes in three dimensions. As illustrated, the composite stator vane 16 is an airfoil shaped structure that includes a concave face 20 and a convex face 22,which are preferably disposed on opposite sides of the composite stator vane 16.

The composite stator vane 16 additionally includes a leading edge 24 and a trailing edge 26 which represent the edges of the composite stator vane 16 that firstly and lastly, respectively, encounter an air stream passing around it. During operation, high pressure intake air, such as that generated by the turbofan rotor 14 (FIG. 1), impinges on the leading edge 24 of the composite stator vane 16 as indicated by directional arrows 28. The leading edge 24 is subject to wear, erosion, and degradation that partly arise from debris and contaminants, including operational fluids, dust, and sand that may be carried in the air stream 28, as well as an erosive operational environment. These debris and contaminants impact the leading edge 24 at high velocity thus leading to nicks, wear, and erosion, generally referenced as 30, all of which impair the performance of the turbofan engine 10 (FIG. 1).

Figure 3:
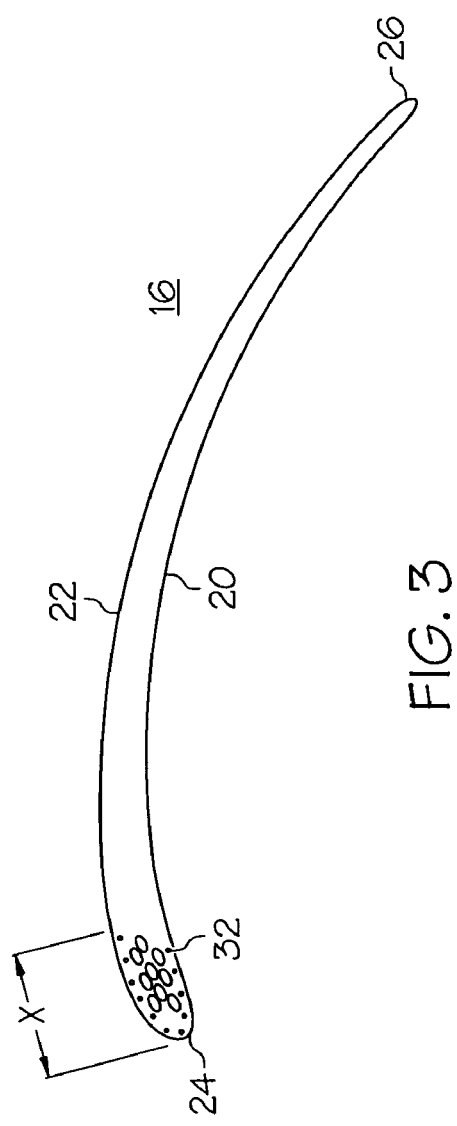
FIG. 3 is a cross-sectional view of a static stator vane showing including leading edge erosion protection according to an embodiment of the present invention.

The composite stator vane 16, as a result of this described wear and degradation, requires protection from these erosive elements in order to maintain engine performance. Referring now to FIG. 3, illustrated in simplified cross-sectional view is a single composite stator vane 16 showing the leading edge 24 portion reinforced with a wire mesh 32 (described below). More specifically, illustrated is leading edge 24 having a portion indicated by dimension "x" that includes a corrosion resistant steel wire mesh screen 32 that is embedded in composite stator vane 16 during the molding process. In this particular embodiment, dimension "x" is 0.3 inches, although this dimension could vary from about 0.1 to 0.5, inclusive. More specifically, wire mesh screen 32 in this particular embodiment has a trailing edge 33 located approximately 0.3 inches from the leading edge 24 of composite stator vane 16. In addition, wire mesh screen in this particular embodiment has 120 wires per square inch, but wire mesh screens having fewer or greater wire per square inch, but typically between about 100 to 150 wires per square inch, inclusive, could also be used.

Figure 4:
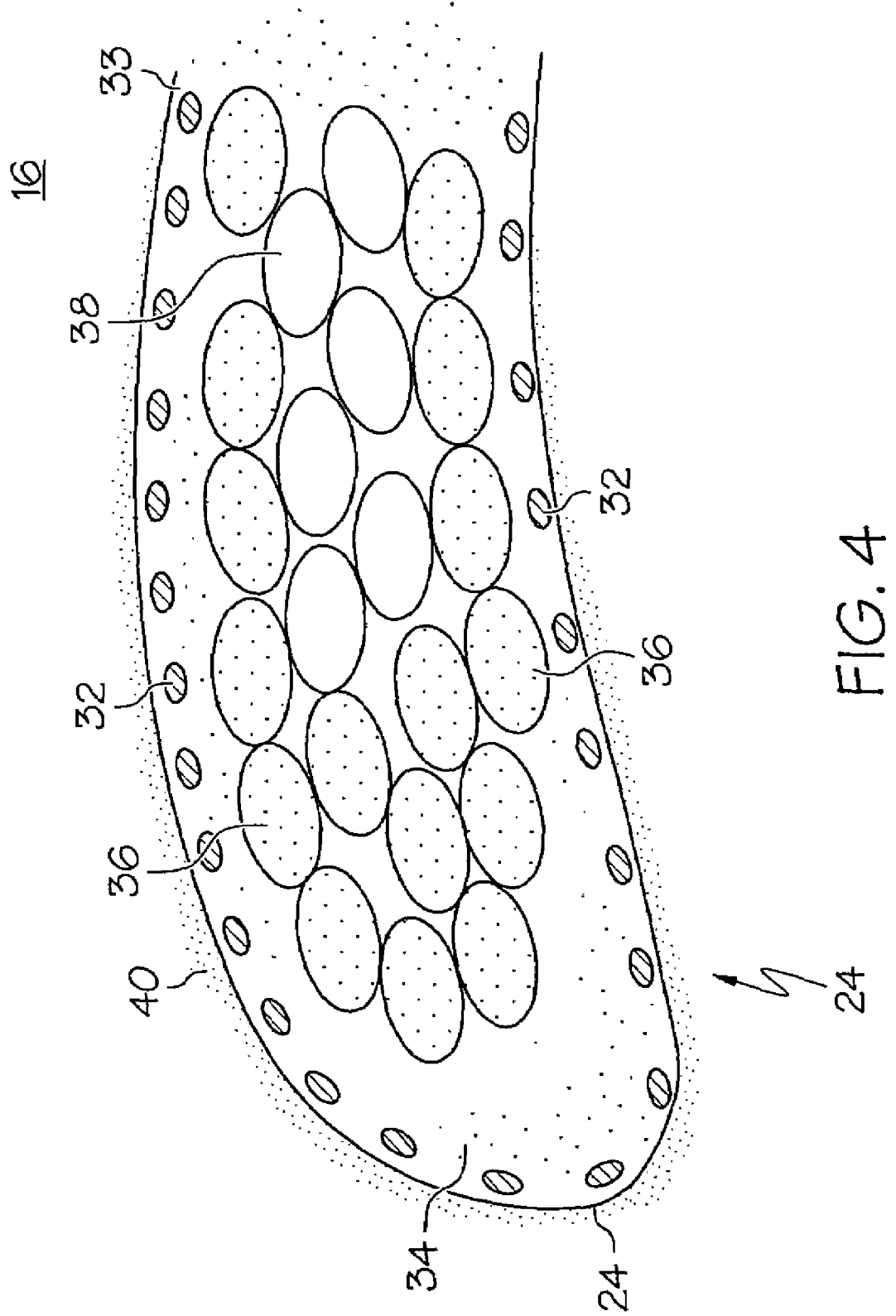
FIG. 4 is an enlarged partial cross-sectional view of a static stator vane including leading edge erosion protection according to an embodiment of the present invention.

Referring now to FIG. 4, illustrated in further detail, is an enlarged partial cross-sectional view of leading edge 24 of the composite stator vane 16. The stainless steel mesh screen 32 allows a epoxy matrix resin 34 of a resin transfer molded (RTM) vane product to extrude to the external surface of the screen 32. Composite stator vane 16 is generally comprised of the epoxy matrix resin 34 or other polymer matrix, the wire mesh screen 32, and a graphite fiber 36 and an aramid fiber 38 wound and twisted preform that is embedded with the epoxy matrix resin 34 or other polymer matrix resin during the fabrication process, in combination referred to herein as a resin transfer molded composite. A thin tapering erosion protection layer 40 is deposited on the leading edge 24 of the composite stator vane 16 by careful masking of the plasma spray and thereby extends the life of the composite stator vane 16 and more particularly leading edge 24. Erosion protection layer 40 is preferably deposited by plasma spray coating, although alternate means of the application of erosion protection layer 40 to the composite stator vane 16 are anticipated by this disclosure. Erosion protection layer 40 is preferably applied by plasma spray on the leading edge 24 up to thickness of 0.010", but preferably having a thickness in a range of 0.003-0.005". Erosion protection layer 40 is tapered to a zero thickness from leading edge 24 to a trailing edge 33 of the wire mesh screen 32 by means of tools and spray masks. Layer 40, deposited on the wire mesh screen 32 of composite stator vane 16, is preferably comprised of at least one of the following materials: tungsten carbide, tungsten carbide-cobalt, cobalt, molybdenum, titanium carbide-nickel, chromium oxide, a high quality plasma sprayed erosion resistant bondcoat or top coat, and/or a nickel plasma sprayed coating.

In a preferred embodiment, erosion protection layer 40 is comprised of a commercially available plasma sprayed $Co_{60}Mo_{28}Cr_{8.5}Si_{2.5}Ni_{1.5}$ alloy coating, such as Tribaloy® T400. This specific material provides many beneficial characteristics, including but not limited to: erosion and abrasion resistance, impact resistance, repair and rebuild operation, resistance to cavitation effects, resistance to chemical attack, galvanic corrosion control, sliding wear resistance, resistance to fretting, galling or adhesive wear, control of oxidation and sulfidation, atmospheric and heat corrosion control, thermal or electrical insulation, and clearance control.

The problem of stator vane leading edge erosion can thus be solved by depositing on the leading edge 24 of the composite stator vane 16, preferably by plasma spray, an erosion protection layer 40 of material that is harder, tougher, and more resistant than the vane material. This addition of an erosion protection layer, such as layer 40 described herein, is possible for a newly manufactured composite stator vane, as well as to repair existing composite stator vanes with a leading edge that includes a wire mesh screen. The addition of the erosion protection layer is cost effective in that several composite stator vanes may be coated at the same time reducing the cost of manufacture and repairs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A turbofan engine comprising:
a turbofan rotor positioned to direct intake air therethrough;
a gas turbine core engine disposed downstream of the turbofan rotor and comprising a compressor, a combustor and a turbine; and
a plurality of composite stator vanes disposed between the turbofan rotor and the gas turbine core engine, and configured to receive air directed through the turbofan rotor and direct the received intake air into the gas turbine engine core, each of the composite stator vanes is defined by a leading edge, a trailing edge, a concave surface and a convex surface, and each of the composite stator vanes comprises:
an epoxy matrix resin;
an epoxy matrix resin composite wound and twisted preform comprised of a plurality of braided graphite fibers and aramid fibers embedded in the epoxy matrix resin;
a wire mesh screen molded into the leading edge of the composite stator vane and embedded into the epoxy matrix resin whereby a portion of the epoxy matrix resin is extruded through the wire mesh screen to an external surface of the wire mesh screen; and
an erosion protection layer disposed on the wire mesh screen and portions of the epoxy matrix resin extruded through the wire mesh screen.

2. A turbofan engine as claimed in claim 1, wherein the wire mesh screen is molded into the leading edge of the composite stator vane and wherein the wire mesh screen has a trailing edge located in a range of about 0.1 to 0.5 inches from the leading edge of the composite stator vane.

3. A turbofan engine as claimed in claim 2, wherein the wire mesh screen has a trailing edge located about 0.3 inches from the leading edge of the composite stator vane.

4. A turbofan engine as claimed in claim 1, wherein the wire mesh screen has between about 100 and 150 wires per square inch.

5. A turbo fan engine as claimed in claim 4, wherein the wire mesh screen has 120 wires per square inch.

6. A turbofan engine as claimed in claim 1, wherein the erosion protection layer has a thickness of up to 0.010".

7. A turbofan engine as claimed in claim 6, wherein the erosion protection layer has a thickness in the range of 0.001 to 0.005 inches.

8. A turbofan engine as claimed in claim 7, wherein the erosion protection layer has a thickness of 0.003 inches and tapers to zero at a trailing edge of the wire mesh screen.

9. A turbofan engine as claimed in claim 1, wherein the erosion protection layer is formed of at least one of the following materials: tungsten carbide, tungsten carbide-cobalt, cobalt, molybdenum, titanium carbide-nickel, chromium oxide, a high quality plasma sprayed erosion resistant bondcoat or top coat.

10. A turbofan engine as claimed in claim 9, wherein the erosion protection layer is formed of a plasma sprayed $Co_{60} Mo_{28} Cr_{8.5} Si_{2.5} Ni_{1.5}$ alloy T400 coating.

11. A composite stator vane comprising:
a graphite fiber and an aramid fiber wound and twisted preform laminated with a matrix resin, wherein the composite stator vane is defined by a leading edge, a trailing edge, a concave surface and a convex surface;
a wire mesh screen embedded into an outermost surface of the leading edge of the epoxy matrix resin and whereby a portion of the epoxy matrix resin is extruded through the wire mesh screen to an external surface of the wire mesh screen; and
an erosion protection layer comprised of an erosion protective material applied to the wire mesh screen and the portions of the epoxy matrix resin extruded through the wire mesh screen at the leading edge of the composite stator vane.

12. A composite stator vane as claimed in claim 11, wherein the wire mesh screen has a trailing edge located in a range of 0.1 to 0.5 inches from the leading edge of the composite stator vane.

13. A composite stator vane as claimed in claim 12, wherein the wire mesh screen has a trailing edge located 0.3 inches from the leading edge of the composite stator vane.

14. A composite stator vane as claimed in claim 11, wherein the erosion protection layer has a thickness of up to 0.010".

15. A composite stator vane as claimed in claim 11, wherein the erosion protection layer has a thickness in the range of 0.001 to 0.005 inches and tapers to zero at a trailing edge of the wire mesh screen.

16. A composite stator vane as claimed in claim 11, wherein the erosion protection layer is formed of at least one of the following materials: tungsten carbide, tungsten carbide-cobalt, titanium carbide-nickel, chromium oxide, and a high quality plasma sprayed erosion resistant bondcoat or top coat.

17. A composite stator vane as claimed in claim 16, wherein the erosion protection layer is formed of a plasma sprayed $Co_{60} Mo_{28} Cr_{8.5} Si_{2.5} Ni_{1.5}$ alloy coating.

18. A composite stator vane defined by a leading edge, a trailing edge, a concave surface and a convex surface, the composite stator vane comprising:

a graphite fiber and an aramid fiber wound and twisted preform laminated with an epoxy matrix resin;

a wire mesh screen embedded into an outermost surface of the epoxy matrix resin at the leading edge of the composite stator vane whereby a portion of the epoxy matrix resin is extruded through the wire mesh screen to an external surface of the wire mesh screen, wherein the wire mesh screen has a trailing edge located in a range of 0.1 to 0.5 inches from the leading edge of the composite stator vane; and an erosion protection layer comprised of an erosion protective material applied to the wire mesh screen and the portions of the epoxy matrix resin extruded through the wire mesh screen, wherein the erosion protection layer tapers from a thickness in a range of 0.001 to 0.005 inches at the leading edge of the composite stator vane to zero at the trailing edge of the wire mesh screen.

19. A composite stator vane as claimed in claim 18, wherein the erosion protection layer is formed of at least one of the following materials: tungsten carbide, tungsten carbide-cobalt, cobalt, molybdenum, titanium carbide-nickel, chromium oxide, a high quality plasma sprayed erosion resistant bondcoat or top coat.

* * * * *